US012577412B2

(12) United States Patent
Ferlic et al.

(10) Patent No.: US 12,577,412 B2
(45) Date of Patent: Mar. 17, 2026

(54) CORROSION INHIBITING COATING COMPOSITIONS

(71) Applicant: PRC-Desoto International, Inc., Sylmar, CA (US)

(72) Inventors: Megan Elizabeth Ferlic, Mars, PA (US); Christopher Andrew Dacko, Pittsburgh, PA (US); Stephen Glenn McQuown, Cheswick, PA (US); John Robert Yetter, Jr., Pittsburgh, PA (US); Michael Allen Mayo, Pittsburgh, PA (US); Elizabeth Anne Furar, Pittsburgh, PA (US); Cedric John Hils, Wexford, PA (US); Justin Jonathan Martin, Harrison City, PA (US); Mary Lyn Chong Lim, Allison Park, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 299 days.

(21) Appl. No.: 18/548,555

(22) PCT Filed: Mar. 4, 2022

(86) PCT No.: PCT/US2022/070951

§ 371 (c)(1),
(2) Date: Aug. 31, 2023

(87) PCT Pub. No.: WO2022/187845

PCT Pub. Date: Sep. 9, 2022

(65) Prior Publication Data

US 2024/0174867 A1 May 30, 2024

Related U.S. Application Data

(60) Provisional application No. 63/157,062, filed on Mar. 5, 2021.

(51) Int. Cl.

| | |
|---|---|
| ***C09D 5/08*** | (2006.01) |
| ***C08K 5/3462*** | (2006.01) |
| ***C08K 5/357*** | (2006.01) |
| ***C08K 5/372*** | (2006.01) |
| ***C09D 5/00*** | (2006.01) |
| ***C09D 5/44*** | (2006.01) |
| ***C09D 7/48*** | (2018.01) |
| ***C09D 163/00*** | (2006.01) |

(52) U.S. Cl.

CPC ............ *C09D 5/086* (2013.01); *C08K 5/3462* (2013.01); *C08K 5/357* (2013.01); *C08K 5/3725* (2013.01); *C09D 5/002* (2013.01); *C09D 5/448* (2013.01); *C09D 7/48* (2018.01); *C09D 163/00* (2013.01)

(58) Field of Classification Search

None

See application file for complete search history.

(56) References Cited

U.S. PATENT DOCUMENTS

| | | | | |
|---|---|---|---|---|
| 3,268,347 | A | 8/1966 | Nagasawa | |
| 4,259,344 | A | 3/1981 | Goenczi et al. | |
| 4,405,428 | A | 9/1983 | Castellucci et al. | |
| 4,405,732 | A | 9/1983 | Chao et al. | |
| 5,178,786 | A * | 1/1993 | Jahnke | C10M 173/02 252/396 |
| 5,519,074 | A * | 5/1996 | Kramer | C07D 295/03 252/396 |
| 5,531,937 | A * | 7/1996 | Minevski | C23F 11/10 252/189 |
| 5,859,095 | A * | 1/1999 | Moyle | C09D 163/00 523/435 |
| 5,969,019 | A | 10/1999 | Kanai et al. | |
| 5,980,619 | A * | 11/1999 | Braig | C07F 9/4816 252/396 |
| 6,187,227 | B1 | 2/2001 | Minevski et al. | |
| 6,620,338 | B2 * | 9/2003 | Fan | C23F 11/10 507/90 |
| 8,070,927 | B2 | 12/2011 | Valko et al. | |
| 8,323,470 | B2 | 12/2012 | Valko et al. | |
| 9,771,483 | B2 | 9/2017 | Kinlen et al. | |
| 2004/0086729 | A1 | 5/2004 | Nguyen et al. | |
| 2004/0255819 | A1 | 12/2004 | Sinko | |
| 2007/0261765 | A1 | 11/2007 | Kendig et al. | |
| 2008/0070018 | A1 | 3/2008 | Miyoshi et al. | |
| 2008/0317962 | A1 | 12/2008 | Hayes et al. | |
| 2009/0047092 | A1 | 2/2009 | Peffer | |
| 2010/0243108 | A1 | 9/2010 | Karabin et al. | |
| 2010/0291307 | A1 | 11/2010 | Mcgee et al. | |
| 2011/0008625 | A1 | 1/2011 | Peffer et al. | |
| 2012/0183806 | A1 | 7/2012 | McMillen et al. | |
| 2015/0037202 | A1 | 2/2015 | Harrington et al. | |
| 2016/0040300 | A1 | 2/2016 | Morris | |
| 2016/0251771 | A1 | 9/2016 | Lawless et al. | |
| 2017/0158864 | A1 | 6/2017 | Olson et al. | |
| 2017/0327695 | A1 | 11/2017 | Senani et al. | |

(Continued)

FOREIGN PATENT DOCUMENTS

| | | | |
|---|---|---|---|
| CN | 1116196 | A | 2/1996 |
| CN | 1201056 | A | 12/1998 |

(Continued)

OTHER PUBLICATIONS

Nozaki—WO 2021-002383 A1—MT—curable resin w—1 claimed morpholine—2021 (Year: 2021).*

(Continued)

*Primary Examiner* — John Vincent Lawler

(57) ABSTRACT

The present invention is directed to a coating composition comprising a film-forming binder; and a corrosion inhibitor comprising at least one of morpholines, monosulfides, and/or piperazines. The present invention is also directed to coatings, coated metal substrates, multi-layered coated metal substrates, and methods of coating substrates.

13 Claims, No Drawings

(56) References Cited

U.S. PATENT DOCUMENTS

| | | | | |
|---|---|---|---|---|
| 2017/0362445 | A1 | 12/2017 | Kinlen et al. | |
| 2020/0048475 | A1 | 2/2020 | Kalsani et al. | |
| 2020/0399479 | A1 * | 12/2020 | Zawacky | C09D 7/61 |

FOREIGN PATENT DOCUMENTS

| | | | | |
|---|---|---|---|---|
| CN | 102892843 | A | 1/2013 | |
| CN | 103590045 | A | 2/2014 | |
| CN | 106715602 | A | 5/2017 | |
| CN | 108307634 | A | 7/2018 | |
| CN | 111670226 | A | 9/2020 | |
| EP | 0090225 | A2 | 10/1983 | |
| EP | 0669328 | A1 | 8/1995 | |
| EP | 0878519 | A1 | 11/1998 | |
| JP | 2012111983 | A | 6/2012 | |
| KR | 10-0355315 | B1 | 12/2002 | |
| KR | 10-2006-0022276 | A | 3/2006 | |
| WO | WO-2021002383 | A1 * | 1/2021 | G03F 7/004 |

OTHER PUBLICATIONS

"Organic Corrosion Inhibitors, Chapter 1—Bogumil Eugeniusz Brycki, Iwona H. Kowalczyk, Adrianna Szulc, Olga Kaczerewska and Marta Pakiet".

Dotsenko et al.: "Some New Reactions and Properties of Xanthane Hydride (5-Amino-1,2,4-dithiazole-3-thione)", Russian Journal of General Chemistry, vol. 88, No. 10, Nov. 26, 2018, pp. 2050-2057, XP036647387.

International Search Report and Written Opinion received for PCT Application Serial No. PCT/US2022/070950 dated Jun. 20, 2022, 9 pages.

International Search Report and Written Opinion received for PCT Application Serial No. PCT/US2022/070951 dated Jun. 20, 2022, 9 pages.

* cited by examiner

CORROSION INHIBITING COATING COMPOSITIONS

FIELD OF THE INVENTION

The present invention is directed towards corrosion inhibiting coating compositions, methods of coating substrates, and coated substrates.

BACKGROUND OF THE INVENTION

Coatings are applied to appliances, automobiles, aircraft, and the like for a number of reasons, most notably for aesthetic reasons, corrosion protection and/or enhanced performance such as durability and protection from physical damage. To improve the corrosion resistance of a metal substrate, corrosion inhibitors are typically used in the coatings applied to the substrate. However, evolving government regulations in view of health and environmental concerns have led to the phasing out of certain corrosion inhibitors and other additives in coating compositions, making the production of effective coating compositions challenging.

It would be desirable to provide suitable curable film-forming compositions which demonstrates enhanced corrosion resistance using corrosion inhibitors having less health and environmental concerns.

SUMMARY OF THE INVENTION

The present invention provides a coating composition comprising a film-forming binder; and a corrosion inhibitor comprising at least one of morpholines, monosulfides, and/or piperazines.

The present invention also provides a metal substrate at least partially coated with a coating comprising a film-forming binder; and a corrosion inhibitor comprising at least one of morpholines, monosulfides, and/or piperazines.

The present invention further provides a coating comprising a film-forming binder; and a corrosion inhibitor comprising at least one of morpholines, monosulfides, and/or piperazines.

The present invention also provides a multilayer coated metal substrate comprising (a) a metal substrate; (b) a first coating layer present on at least a portion of said metal substrate; and (c) a second coating layer present on at least a portion of the first coating, wherein the first coating layer, the second coating layer or both layers comprise a coating comprising a film-forming binder; and a corrosion inhibitor comprising at least one of morpholines, monosulfides, and/or piperazines.

The present invention further provides a method for coating a substrate comprising applying the coating composition comprising a film-forming binder; and a corrosion inhibitor comprising at least one of morpholines, monosulfides, and/or piperazines to at least a portion of the substrate.

DETAILED DESCRIPTION OF THE INVENTION

The present invention is directed to a coating composition comprising a film-forming binder and a corrosion inhibitor.

Corrosion Inhibitor

The coating composition according to the present invention comprises a corrosion inhibiting component comprising a corrosion inhibitor comprising at least one of morpholines, monosulfides, and/or piperazines.

A "corrosion inhibitor", including the corrosion inhibitor of the present invention, will be understood as referring to a compound that inhibits corrosion of metal. The effectiveness of the corrosion inhibitor in a cured coating in preventing corrosion of the substrate onto which the coating composition is applied and cured may be demonstrated by salt spray corrosion testing according to ASTM B117. Whether the corrosion inhibitor improves corrosion resistance may be determined by testing the ability of the cured coating comprising the corrosion inhibitor to improve the corrosion performance as measured by one or more methods, such as through reduced scribe corrosion, scribe shine, and/or reduction in the number and/or size of blisters present in the coating adjacent to the scribe, when compared to a similar composition that does not include the corrosion inhibitor.

The effectiveness of the corrosion inhibitor may also be evaluated by measuring the passive window and polarization resistance (Rp) of the inhibitor. For example, the corrosion inhibitor of the present invention has a passive window and polarization resistance (Rp) greater than an uninhibited control when measured over the same substrate. The passive window (or window of passivity) and polarization resistance (Rp) may be measured according to the PASSIVE WINDOW TEST METHOD or LINEAR POLARIZATION RESISTANCE TEST METHOD, respectively, each of which is described in the examples section below. Each test evaluates the ability of the corrosion inhibitor to inhibit corrosion of a substrate exposed to a salt solution, and the test is compared relative to the same substrate exposed to the same salt solution that lacks the corrosion inhibitor. The test provides an indicator as to whether addition of the corrosion inhibitor to the salt solution will inhibit corrosion of the substrate in comparison to an uninhibited salt solution tested on the same substrate. Higher values for passive window and polarization resistance (Rp) of the inhibited salt solution relative to the uninhibited control salt solution indicate at least some degree of inhibition of corrosion by the corrosion inhibitor. The measurements for passive window and polarization resistance will be dependent upon the type of substrate used and will vary therewith. The corrosion inhibitor of the present invention has a passive window value greater than an uninhibited control tested over the same substrate, as measured according to the PASSIVE WINDOW TEST METHOD, and the corrosion inhibitor of the present invention has a polarization resistance (Rp) greater than the observed polarization resistance (Rp) uninhibited control tested over the same substrate, as measured according to the LINEAR POLARIZATION RESISTANCE TEST METHOD.

The corrosion inhibitor may have a passive window of greater than 28 mV, such as greater than 40 mV, such as greater than 60 mV, such as greater than 75 mV, such as greater than 100 mV, such as greater than 125 mV, such as greater than 150 mV, such as greater than 160 mV, such as greater than 175 mV when tested over 2024-T3 aluminum alloy. The passive window may be measured according to the PASSIVE WINDOW TEST METHOD as described in the Examples section below.

The corrosion inhibitor may have a polarization resistance (Rp) of greater than 28 $k\Omega*cm^2$, such as greater than 40 $k\Omega*cm^2$, such as greater than 50 $k\Omega*cm^2$, such as greater than 60 $k\Omega*cm^2$, such as greater than 70 $k\Omega*cm^2$, such as greater than 75 $k\Omega*cm^2$, such as greater than 90 $k\Omega*cm^2$, such as greater than 100 $k\Omega*cm^2$ when tested over 2024-T3 aluminum alloy. The polarization resistance may be measured according to the LINEAR POLARIZATION RESISTANCE TEST METHOD as described in the Examples section below.

The corrosion inhibitor may be substantially free, essentially free or completely free of functionality (that is, any functional group) that reacts with the functionality in the film-forming binder. As such, the corrosion inhibitor may be substantially free, essentially free or completely of functional groups that may be reactive with functional groups of the film-forming polymer or curing agent to form covalent bonds therewith under conditions during which the coating composition is cured. Non-limiting examples of such functional groups include amino groups, thiol groups, hydroxyl groups, carboxylic acid group, carbamate groups, isocyanato groups, and ethylenically unsaturated groups such as vinyl groups, as well as any salts thereof. It will be appreciated, therefore, that any functionality that is present on the corrosion inhibitor is chosen based on the functionality in the film forming binder, such as the film-forming polymer and/or curing agent in the binder. For example, at least 50% by weight of the total amount of corrosion inhibitor may remain unbound to the film-forming binder and free in the coating layer, such as at least 60% by weight, such as at least 70% by weight, such as at least 80% by weight, such as at least 90% by weight, such as at least 95% by weight, such as at least 97% by weight, such as at least 99% by weight, based on the total weight of corrosion inhibitor. It will be understood, based on the above, that the corrosion inhibitor according to the present invention may contain some level of functionality that could react with the functionality in the film-forming binder, provided that any reaction that might occur between the functionality of the corrosion inhibitor and the film-forming resin will not be at a level so as to interfere with the activity of the corrosion inhibitor and/or at a level so as to contribute to the cure or crosslinking of the coating. Without intending to be bound to any theory, it is believed that the lack of such functional groups allows the corrosion inhibitor to retain mobility in the cured coating film as the corrosion inhibitor is not covalently bound to the polymeric matrix of the film-forming polymer and curing agent in the cured coating film, and the mobility allows the corrosion inhibitor to move within the cured film to areas of the coating or to areas of the substrate under or adjacent to the coating that require protection, such as damaged sections of the coating. One can determine if the corrosion inhibitor used in a coating composition is substantially free of such functionality by confirming that corrosion inhibitor can be extracted from the cured coating in an amount that would improve corrosion resistance. For example, the cured coating may have at least 50% of the nonvolatile corrosion inhibitor extractable as compared to the amount of corrosion inhibitor added to the coating composition. Extraction tests can be performed by methods known in the art. For example, coating slices from the coated panel may be removed using a microtome and ground into a course powder using a mortar and pestle. The mass of the ground coating may be determined using a tared 20 mL scintillation vial, and the coating mass can be diluted with an amount of methylene chloride resulting in a ~2 mg/g solution. The scintillation vial may then be tightly sealed and placed in a 40° C. hot room for 24 hours, and the amount of corrosion inhibitor extracted may be determined by high performance liquid chromatograph (HPLC).

Non-limiting examples of morpholines include 4-phenylthiomorpholine-3,5-dione, 2-morpholino-4-phenylthiazole, 4-(4-phenyl-2-thiazolyl)-morpholine, 4-(2-thienylmethyl) morpholine, 4-(4-morpholinylacetyl)morpholine, 4-(4-morpholinyldisulfanyl)morpholine, 2,6-dimethyl-4-[(3-methyl-2-thienyl)carbonyl]morpholine, 2,6-dimethyl-4-(2-pyrazinylcarbonyl)morpholine, 4-[(3-methyl-2-thienyl)methyl] morpholine, 4-{[(4-morpholinylmethyl)sulfanyl]methyl} morpholine, 4-[2-(5-ethyl-2-pyridinyl)ethyl]morpholine, 4-[4-(4-morpholinyl)butyl]morpholine, 4-(5-methoxy-2-methyl-4-pyrimidinyl)morpholine, 4-(5-methyl-2-pyrimidinyl)morpholine, 4-[(1,3-dimethyl-1h-pyrazol-5-yl)carbonyl]morpholine, 4-[(1-methyl-1h-pyrazol-5-yl)carbonyl] morpholine, 4-[(3,5-dimethyl-1h-pyrazol-1-yl)carbonyl] morpholine, 4-{[(3-{[2-(4-morpholinyl)-2-oxoethyl] sulfanyl}-1,2,4-thiadiazol-5-yl)sulfanyl]acetyl}morpholine, 4-morpholinopyridine, and morpholin-4-yl morpholine-4-carbodithioate (commercially available as Cure Rite 18 from AkroChem, Inc.).

Non-limiting specific examples of monosulfides include tetramethylthiuram monosulfide (commercially available as VANAX™™ from Vanderbilt Chemicals, LLC).

Non-limiting specific examples of piperazines include 1-boc-(4-benzyl)piperazine, tert-butyl 4-(1-benzylpiperidin-4-yl)piperazine-1-carboxylate, piperazine-1,4-dicarbothioic acid bis-phenylamide, 1,4-bis(2-(2-pyridinyl)ethyl)piperazine, 1,4-bis-(2-benzyloxy-ethyl)-piperazine, 1,4-di(2-furoyl)piperazine, 1-ethyl-4-(2-thienylsulfonyl)piperazine, 1-isopropyl-4-(2-thienylcarbonyl)piperazine, 1-methyl-4-[(3-methyl-2-thienyl)methyl]piperazine, 1-methyl-4-(3-thienylmethyl)piperazine, 1-isopropyl-4-[(1-methyl-1h-pyrrol-2-yl)methyl]piperazine, and 1,4-di-tert-butyl piperazine-1,4-dicarboxylate.

The corrosion inhibitor may be a non-polymeric compound. As used herein, the term "non-polymeric" with respect to the corrosion inhibitor refers to a molecule having three or fewer repeating units, such as two or fewer repeating units. For example, the corrosion inhibitors of the present invention may have an average molecular weight of 1000 Daltons or less.

The corrosion inhibitor may comprise at least one heterocyclic ring comprising a ring structure of at least 5 atoms connected via covalent bonds, wherein the ring comprises carbon and at least one heteroatom of sulfur or nitrogen. The heterocyclic ring may optionally further comprise at least one heteroatom of oxygen or phosphorus. The corrosion inhibitor may optionally further comprise at least one additional heteroatom of oxygen, nitrogen, sulfur, phosphorus, or an aromatic ring bound directly or indirectly to the heterocyclic ring.

The corrosion inhibitor may be free of sulfide groups.

The corrosion inhibitor may be free of polysulfide groups. As used herein, the term "polysulfide" refers to a compound having a group having two or more sulfur atoms covalently bonded in a chain, e.g., $—S_n—$ wherein n is greater than or equal to 2. A "disulfide" refers to a polysulfide wherein n is 2.

The corrosion inhibitor may further comprise a disulfide corrosion inhibitor as a second corrosion inhibitor in addition to those described above.

Alternatively, the corrosion inhibitor may be substantially free, essentially free, or completely free of corrosion inhibitors comprising a disulfide. As used herein, a corrosion inhibitor is substantially free or essentially free of such compounds if such compounds are present, if at all, in an amount of no more than 5% by weight or no more than 1% by weight, respectively, based on the total weight of the corrosion inhibitor.

The corrosion inhibitor may be substantially free, essentially free, or completely free of azoles, oxazoles, thiazoles, thiazolines, imidazoles, diazoles, indolizines, triazines, tetrazoles and/or tolutriazole. As used herein, a corrosion inhibitor is substantially free or essentially free of such compounds if such compounds are present, if at all, in an amount of no more than 5% by weight or no more than 1% by weight, respectively, based on the total weight of the corrosion inhibitor.

The coating composition may be substantially free, essentially free, or completely free of azoles, oxazoles, thiazoles, thiazolines, imidazoles, diazoles, indolizines, triazines, tetrazoles and/or tolutriazole. As used herein, a coating composition is substantially free or essentially free of such compounds if the compound is present, if at all, in an amount of no more than 1.5% by weight or no more than 0.5% by weight, respectively, based on the total resin solids weight of the coating composition.

The coating composition, as well as the corrosion inhibitor, may be substantially free, essentially free, or completely free of any of the corrosion inhibitors described above. The term "substantially free" as used in this context means the corrosion inhibitor and/or the coating composition contains less than 0.1% by weight, "essentially free" means less than 0.01% and "completely free" means less 0.001% by weight, based on the total weight of the resin solids, of any of these compounds.

The coating composition, as well as the corrosion inhibitor, may be substantially free, essentially free, or completely free of 1-methyl-benzotriazole, 1-methyl-1,2,3-triazole, 1-phenyl-1,2,3-triazole, 4-methyl-2-phenyl-1,2,3-triazole, 1-benzyl-1,2,3-triazole, 1-benzamido-4-methyl-1,2,3-triazole, 1-methyl-1,2,4-triazole, 1,3-diphenyl-1,2,4-triazole, 1-phenyl-1,2,4-triazole-5-one, 1-methyl-benzotriazole, methyl-1-benzotriazolecarboxylate, benzothiazole, 1-phenyl-4-methylimidazole, and/or 1-(p-tolyl)-4-methylimidazole. The term "substantially free" as used in this context means the corrosion inhibitor and/or the coating composition contains less than 0.1% by weight, "essentially free" means less than 0.01% and "completely free" means less 0.001% by weight, based on the total weight of the resin solids, of any of these compounds.

The coating composition, as well as the corrosion inhibitor, may be substantially free, essentially free, or completely free of metallate anion ion-paired through Coulomb attraction to a pyridine, a pyrrole, an imidazole or mixtures thereof. As used herein, the term "metallate anion" refers to metallates of molybdenum, tungsten, vanadium, zirconium, chromium or mixtures thereof. The term "substantially free" as used in this context means the corrosion inhibitor and/or the coating composition contains less than 0.05% by weight, "essentially free" means less than 0.01% and "completely free" means less 0.001% by weight, based on the total weight of the resin solids, of such metallate anion.

The coating composition, as well as the corrosion inhibitor, may be substantially free, essentially free, or completely free of any corrosion inhibitor that comprises a functional group that is capable of reacting with components of the film-forming binder during cure. The term "substantially free" as used in this context with respect to the coating composition means that the coating composition contains less than 0.1% by weight, "essentially free" means less than 0.01% and "completely free" means less 0.001% by weight of the corrosion inhibitor that comprises a functional group that is capable of reacting with components of the film-forming binder during cure, based on the total weight of the resin solids. The term "substantially free" as used in this context with respect to the corrosion inhibitor means that the corrosion inhibitor component contains less than 5% by weight, "essentially free" means less than 1% and "completely free" means less 0.001% by weight of the corrosion inhibitor that comprises a functional group that is capable of reacting with components of the film-forming binder during cure, based on the total weight of the corrosion inhibitor.

The corrosion inhibitor may be present in an amount of at least 1% by weight, such as at least 3% by weight, such as at least 5% by weight, such as at least 7% by weight, such as at least 9% by weight, such as at least 10% by weight, and may be present in an amount of no more than 50% by weight, such as no more than 40% by weight, such as no more than 35% by weight, such as no more than 30% by weight, such as no more than 25% by weight, such as no more than 20% by weight, based on the total resin solids weight of the coating composition. The corrosion inhibitor may be present in an amount of 1% to 50% by weight, such as 3% to 40% by weight, such as 5% to 35% by weight, such as 7% to 30% by weight, such as 9% to 25% by weight, such as 10% to 20% by weight, based on the total resin solids weight of the coating composition.

Film-Forming Binder

As discussed further below, the film-forming binder of the coating composition of the present invention is not limited and may comprise any curable, organic film-forming binder. The binder may be selected based upon the type of coating composition. For example, electrodepositable coating compositions include binders comprising ionic, salt group-containing film-forming polymers whereas other types of curable, film-forming coating compositions, such as liquid, powder, and 100% solids coating compositions, include a curable, organic film-forming binder component that does not require resins having an ionic charge.

According to the present invention, the coating composition may comprise an electrodepositable coating composition, and the film-forming binder of the electrodepositable coating composition may comprise an ionic salt group-containing film-forming polymer.

As used herein, the term "curable" and like terms refers to compositions that undergo a reaction in which they "set" irreversibly, such as when the components of the composition react with each other and the polymer chains of the polymeric components are joined together by covalent bonds. This property is usually associated with a crosslinking reaction of the composition constituents often induced, for example, by heat or radiation. See Hawley, Gessner G. The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents.

As used herein, the term "organic film-forming binder component" refers to carbon based materials (resins, crosslinkers and the like, such as those further described below) that comprise less than 50 wt % of inorganic materials, based on the total weight of the binder component. The organic film-forming binder component may comprise a mixture of organic and inorganic polymers and/or resins so long as the organic content comprises more than 50 wt % of the total weight of the organic film-forming binder component, such as more than 60 wt %, such as more than 70 wt %, such as more than 80 wt %, such as more than 90 wt %.

As used herein, the term "electrodepositable coating composition" refers to a composition that is capable of being deposited onto an electrically conductive substrate under the influence of an applied electrical potential.

According to the present invention, the ionic salt group-containing film-forming polymer may comprise a cationic salt group containing film-forming polymer. The cationic salt group-containing film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge. As used herein, the term "polymer" encompasses, but is not limited to, oligomers and both homopolymers and copolymers. The cationic salt group-containing film-forming polymer may comprise active hydrogen functional groups. As used herein, the term "active hydrogen functional groups" refers to those groups that are reactive with isocyanates as determined by the Zerewitinoff test as discussed above, and include, for example, hydroxyl groups, primary or secondary amine groups, and thiol groups. Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in United States Patent Application Publication No. 2003/0054193 A1 at paragraphs to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication No. 2003/0054193 A1 at paragraphs to [0123], this portion of which being incorporated herein by reference.

The active hydrogen-containing, cationic salt group-containing film-forming polymer is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

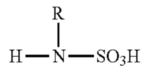

wherein R is hydrogen or an alkyl group having 1 to 4 carbon atoms. Mixtures of the above mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be 0.1% based on the total amines in the active hydrogen-containing, cationic salt group-containing film-forming polymer. Alternatively, the amount of acid used to neutralize the active hydrogen-containing, cationic salt group-containing film-forming polymer may be <100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be 20%, 35%, 50%, 60%, or 80% based on the total amines in the cationic salt group-containing film-forming polymer.

According to the present invention, the cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition.

As used herein, the "resin solids" include the components of the film-forming binder of the coating composition. For example, the resin solids may include film-forming polymers (including ionic salt group-containing film-forming polymer), the curing agent, and any additional water-dispersible non-pigmented component(s) present in the coating composition.

According to the present invention, the ionic salt group containing film-forming polymer may comprise an anionic salt group containing film-forming polymer. As used herein, the term "anionic salt group containing film-forming polymer" refers to an anionic polymer comprising at least partially neutralized anionic functional groups, such as carboxylic acid and phosphoric acid groups that impart a negative charge. As used herein, the term "polymer" encompasses, but is not limited to, oligomers and both homopolymers and copolymers. The anionic salt group-containing film-forming polymer may comprise active hydrogen functional groups. As used herein, the term "active hydrogen functional groups" refers to those groups that are reactive with isocyanates as determined by the Zerewitinoff test as discussed above, and include, for example, hydroxyl groups, primary or secondary amine groups, and thiol groups. Anionic salt group-containing film-forming polymers that comprise active hydrogen functional groups may be referred to as active hydrogen-containing, anionic salt group-containing film-forming polymers. The anionic salt group containing film-forming polymer may be used in an anionic electrodepositable coating composition.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

Also suitable are phosphated epoxy resins comprising at least one terminal group comprising a phosphorous atom covalently bonded to the resin by a carbon-phosphorous bond or by a phosphoester linkage, and at least one carbamate functional group. Non-limiting examples of such resins are described in U.S. patent application Ser. No. 16/019,590 at par. [0012] to [0040].

According to the present invention, the anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition. As used herein, the "resin solids" include the ionic salt group-containing film-forming polymer, the curing agent, and any additional water-dispersible non-pigmented component(s) present in the electrodepositable coating composition.

The film-forming binder may comprise a curable, organic film-forming binder comprising an organic resin component.

The organic film-forming binder component may comprise (a) a resin component comprising reactive functional groups; and (b) a curing agent component comprising functional groups that are reactive with the functional groups in the resin component (a), although the film-forming binder component may also contain resin that will crosslink with itself rather than an additional curing agent (i.e. self-crosslinking).

The resin component (a) used in the organic film-forming binder component of the curable film-forming compositions of the present invention may comprise one or more of acrylic polymers, polyesters, polyurethanes, polyamides, polyethers, polythioethers, polythioesters, polythiols, polyenes, polyols, poly silanes, polysiloxanes, fluoropolymers, polycarbonates, and epoxy resins. Generally these compounds, which need not be polymeric, can be made by any method known to those skilled in the art. The functional groups on the film-forming binder may comprise at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, and maleic acid or anhydride groups. The functional groups on the film-forming binder are selected so as to be reactive with those on the curing agent (b) or to be self-crosslinking.

Suitable acrylic compounds include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms that are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

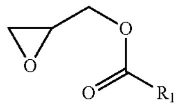

where $R_1$ is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally, any method of producing such polymers that is known to those skilled in the art utilizing art recognized amounts of monomers can be used.

The resin component (a) in the film-forming binder component of the curable film-forming composition may comprise an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be comprise, for example, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the resin component (a) in the film-forming binder component of the curable film-forming composition. Among the polyurethanes that can be used are polymeric polyols, which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate that is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which, upon neutralization with bases such as amines, allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

(i)

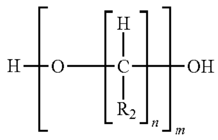

or (ii)

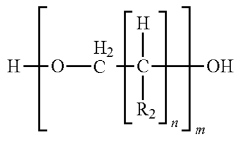

where the substituent $R_2$ is hydrogen or lower alkyl containing from 1 to 5 carbon atoms including mixed substituents, n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from The Lycra Company, and POLYMEG, available from LyondellBasell.

Carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups. Examples of suitable amine functional polyethers include those sold under the name JEFFAMINE, such as JEFFAMINE D2000, a polyether functional diamine available from Huntsman Corporation.

Suitable epoxy functional polymers for use as the resin component (a) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of 80° C. to 160° C. for 30 to 180 minutes until an epoxy group-containing resinous reaction product is obtained.

The equivalent ratio of reactants, i.e., epoxy:polyhydroxyl group-containing material is typically from about 1.00:0.75 to 1.00:2.00. It will be appreciated by one skilled in the art that the chain extended polyepoxide will lack epoxide functional groups when reacted with the polyhydroxyl group-containing material such that an excess of hydroxyl functional groups are present. The resulting polymer will comprise hydroxyl functional groups resulting from the excess of hydroxyl functional groups and the hydroxyl functional groups produced by the ring-opening reaction of the epoxide functional groups.

The polyepoxide by definition has at least two 1,2-epoxy groups. In general, the epoxide equivalent weight of the polyepoxide may range from 100 to 2000, such as from 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency of one to two, such as greater than one and less than two or of two; that is, polyepoxides that have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as any of those disclosed above. The present invention may comprise epoxy resins such as diglycidyl ethers of Bisphenol A, Bisphenol F, glycerol, novolacs, and the like. Exemplary suitable polyepoxides are described in U.S. Pat. No. 4,681,811 at column 5, lines 33 to 58, the cited portion of which is incorporated by reference herein. Non-limiting examples of suitable commercially available epoxy resins include EPON 828 and EPON 1001, both available from Momentive, and D.E.N. 431 available from Dow Chemical Co.

Epoxy functional film-forming polymers may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins. Epoxide functional groups may be incorporated into a resin by reacting hydroxyl groups on the resin with an epihalohydrin or dihalohydrin such as epichlorohydrin or dichlorohydrin in the presence of alkali.

Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minnesota under the name FLUORAD; and perfluorinated hydroxyl functional (meth) acrylate resins.

The amount of resin component (a) in the curable film-forming composition may range from 10 to 90% by weight, based on the total weight of resin solids in the curable film-forming composition. For example, the minimum amount of resin component may be at least 10% by weight, such as at least 20% by weight or at least 30% by weight, based on the total weight of resin solids in the curable film-forming composition. The maximum amount of resin may be 90% by weight, such as 80% by weight, or 70% by weight. Ranges of resin component may include, for example, 20 to 80% by weight, 50 to 90% by weight, 60 to 80% by weight, 25 to 75% by weight, based on the total weight of resin solids in the curable film-forming composition.

Curing Agent

According to the present invention, the film-forming binder of the coating composition of the present invention may further comprise a curing agent. The curing agent may react with the reactive groups, such as active hydrogen groups, of the ionic salt group-containing film-forming polymer to effectuate cure of the coating composition to form a coating. As used herein, the term "cure", "cured" or similar terms, as used in connection with the coating compositions described herein, means that at least a portion of the components that form the coating composition are crosslinked to form a coating. Additionally, curing of the coating composition refers to subjecting said composition to curing conditions (e.g., elevated temperature) leading to the reaction of the reactive functional groups of the components of the coating composition, and resulting in the crosslinking of the components of the composition and formation of an at least partially cured coating. Non-limiting examples of suitable curing agents are at least partially blocked polyisocyanates, aminoplast resins and phenoplast resins, such as phenolformaldehyde condensates including allyl ether derivatives thereof.

According to the present invention, the film-forming binder component of the electrodepositable coating composition may further comprise a curing agent. The current agent may comprise, for example, an at least partially blocked polyisocyanate, aminoplast resin, phenoplast resin, or any combination thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4,4',4''-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example, 1,2-propanediol; a 1,3-alkane diol, for example, 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example, 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

The blocking agent may also comprise an alpha-hydroxy amide, ester or thioester. As used herein, the term "alpha-hydroxy amide" refers to an organic compound having at least one alpha-hydroxy amide moiety that includes a hydroxyl functional group covalently bonded to an alpha-carbon of an amide group. As used herein, the term "alpha-hydroxy ester" refers to an organic compound having at least one alpha-hydroxy ester moiety that includes a hydroxyl functional group covalently bonded to an alpha-carbon of an ester group. As used herein, the term "alpha-hydroxy thioester" refers to an organic compound having at least one alpha-hydroxy thioester moiety that includes a hydroxyl functional group covalently bonded to an alpha-carbon of a thioester group. The blocking agent comprising an alpha-hydroxy amide, ester or thioester may comprise a compound of structure (I):

(I)

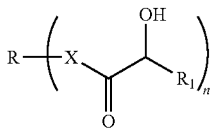

wherein X is $N(R_2)$, O, S; n is 1 to 4; when n=1 and $X=N(R_2)$, R is hydrogen, a $C_1$ to $C_{10}$ alkyl group, an aryl group, a polyether, a polyester, a polyurethane, a hydroxy-alkyl group, or a thio-alkyl group; when n=1 and X=O or S, R is a $C_1$ to $C_{10}$ alkyl group, an aryl group, a polyether, a polyester, a polyurethane, a hydroxy-alkyl group, or a thio-alkyl group; when n=2 to 4, R is a multi-valent $C_1$ to $C_{10}$ alkyl group, a multi-valent aryl group, a multi-valent polyether, a multi-valent polyester, a multi-valent polyurethane; each $R_1$ is independently hydrogen, a $C_1$ to $C_{10}$ alkyl group, an aryl group, or a cycloaliphatic group; each $R_2$ is independently hydrogen, a $C_1$ to $C_{10}$ alkyl group, an aryl group, a cycloaliphatic group, a hydroxy-alkyl group, or a thio-alkyl group; and R and $R_2$ together can form a cycloaliphatic, heterocyclic structure. The cycloaliphatic, heterocyclic structure may comprise, for example, morpholine, piperidine, or pyrrolidine. It should be noted that R can only be hydrogen if X is $N(R_2)$. Specific examples of suitable alph-hydroxide amide, ester, or thioester blocking agents are described in International Publication No. WO 2018/148306 A1, at par. to [0026], the cited portion of which is incorporated herein by reference.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at co1.6, line 20 to col. 7, line 12, the cited portion of which being incorporated herein by reference.

The curing agent may optionally comprise a high molecular weight volatile group. As used herein, the term "high molecular weight volatile group" refers to blocking agents and other organic byproducts that are produced and volatilized during the curing reaction of the coating composition having a molecular weight of at least 70 g/mol, such as at least 125 g/mol, such as at least 160 g/mol, such as at least 195 g/mol, such as at least 400 g/mol, such as at least 700 g/mol, such as at least 1000 g/mol, or higher, and may range from 70 to 1,000 g/mol, such as 160 to 1,000 g/mol, such as 195 to 1,000 g/mol, such as 400 to 1,000 g/mol, such as 700 to 1,000 g/mol. For example, the organic byproducts may include alcoholic byproducts resulting from the reaction of the film-forming polymer and an aminoplast or phenoplast curing agent, and the blocking agents may include organic compounds, including alcohols, used to block isocyanato groups of polyisocyanates that are unblocked during cure. For clarity, the high molecular weight volatile groups are covalently bound to the curing agent prior to cure, and explicitly exclude any organic solvents that may be present in the coating composition. Upon curing, the pigment-to-binder ratio of the deposited film may increase in the cured film relative to deposited uncured pigment to binder ratio in the coating composition because of the loss of a higher mass of the blocking agents and other organic byproducts derived from the curing agent that are volatilized during cure. High molecular weight volatile groups may comprise 5% to 50% by weight of the film-forming binder, such as 7% to 45% by weight, such as 9% to 40% by weight, such as 11% to 35%, such as 13% to 30%, based on the total weight of the film-forming binder. The high molecular weight volatile groups and other lower molecular weight volatile organic compounds produced during cure, such as lower molecular weight blocking agents and organic byproducts produced during cure, may be present in an amount such that the relative weight loss of the film-forming binder deposited onto the substrate relative to the weight of the film-forming binder after cure is an amount of 5% to 50% by weight of the film-forming binder, such as 7% to 45% by weight, such as 9% to 40% by weight, such as 11% to 35%, such as 13% to 30%, based on the total weight of the film-forming binder before and after cure.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

According to the present invention, the film-forming binder component of the non-electrodepositable coating composition may further comprise a curing agent (b). Suitable curing agents (b) for use in the film-forming binder component of the coating compositions of the present invention include aminoplasts, polyisocyanates, including blocked isocyanates, polyepoxides, beta-hydroxyalkylamides, polyacids, organometallic acid-functional materials, polyamines, polyamides, polysulfides, polythiols, polyenes such as polyacrylates, polyols, polysilanes and mixtures of any of the foregoing, and include those known in the art for any of these materials. The terms "curing agent" "crosslinking agent" and "crosslinker" are herein used interchangeably.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Allnex, under the trademark CYMEL and from INEOS under the trademark RESIMENE.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine, butyl glycol amide, and butyl lactamide.

The crosslinking agent may optionally comprise a high molecular weight volatile group. These may be the same as discussed above. High molecular weight volatile groups may comprise 5% to 50% by weight of the film-forming binder, such as 7% to 45% by weight, such as 9% to 40% by weight, such as 11% to 35%, such as 13% to 30%, based on the total weight of the organic film-forming binder. The high molecular weight volatile groups and other lower molecular weight volatile organic compounds produced during cure, such as lower molecular weight blocking agents and organic byproducts produced during cure, may be present in an amount such that the relative weight loss of the organic film-forming binder deposited onto the substrate relative to the weight of the organic film-forming binder after cure is an amount of 5% to 50% by weight of the organic film-forming binder, such as 7% to 45% by weight, such as 9% to 40% by weight, such as 11% to 35%, such as 13% to 30%, based on the total weight of the organic film-forming binder before and after cure.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as cros slinking agents.

Beta-hydroxyalkylamides are suitable curing agents for polymers having carboxylic acid groups. The beta-hydroxyalkylamides can be depicted structurally as follows:

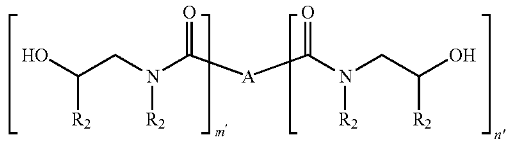

wherein each $R_2$ is hydrogen or lower alkyl containing from 1 to 5 carbon atoms including mixed substituents or:

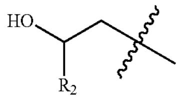

wherein $R_2$ is hydrogen or lower alkyl containing from 1 to 5 carbon atoms including mixed substituents; A is a bond or a polyvalent organic radical derived from a saturated, unsaturated, or aromatic hydrocarbon including substituted hydrocarbon radicals containing from 2 to 20 carbon atoms; m' is equal to 1 or 2; n' is equal to 0 or 2, and m'+n' is at least 2, usually within the range of from 2 up to and including 4. Most often, A is a $C_2$ to $C_{12}$ divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid equivalent weight ranging from 100 to 2,000 g/mol, based on the total solid weight of the acid functional acrylic polymers. Acid functional group-containing polyesters can be used as well. Low molecular weight polyesters and half-acid esters can be used that are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, the cited portion of which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, TX) under the designation of JEFFLINK such as JEFFLINK 754. Additional aliphatic cyclic polyamines may also be used, such as DESMOPHEN NH 1520 available from Covestro and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Evonik.

Suitable polyamides include any of those known in the art. For example, ANCAMIDE polyamides, available from Evonik.

Suitable polyenes may include those that are represented by the formula:

$$A-(X)_m$$

wherein A is an organic moiety, X is an olefinically unsaturated moiety and m is at least 2, typically 2 to 6. Examples of X are groups of the following structure:

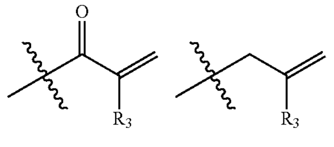

(meth)acryl (meth)allyl wherein each $R_3$ is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is often 200 to 10,000 as determined by GPC using polystyrene as a standard. The molecule often contains on average 2 to 20 olefinic double bonds that are polymerizable by exposure to radiation. Aliphatic and/or cycloaliphatic (meth)acrylates in each case are often used. (Cyclo)aliphatic polyurethane (meth)acrylates and (cyclo) aliphatic polyester (meth)acrylates are particularly suitable. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example, 1,4-butane diol, 1,6-hexane diol and/or trimethylol propane. Examples of polyester (meth)acrylates are the reaction products of (meth) acrylic acid or anhydride with polyols, such as diols, triols and tetrols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example, 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—$S_x$—), wherein x is at least 2, such as from 2 to 4, and combinations of such linkages.

The polythiols for use in the present invention include materials of the formula:

$$R_4—(SH)_{n'}$$

wherein $R_4$ is a polyvalent organic moiety and n' is an integer of at least 2, typically 2 to 6.

Non-limiting examples of suitable polythiols include esters of thiol-containing acids of the formula HS—$R_5$—COOH wherein $R_5$ is an organic moiety with polyhydroxy compounds of the structure $R_6$—(OH). wherein $R_6$ is an organic moiety and n' is at least 2, typically 2 to 6. These components can be reacted under suitable conditions to give polythiols having the general structure:

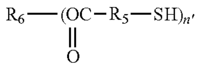

wherein $R_5$, $R_6$ and n' are as defined above.

Examples of thiol-containing acids are thioglycolic acid (HS—$CH_2COOH$), α-mercaptopropionic acid (HS—CH($CH_3$)—COOH) and β-mercaptopropionic acid (HS—$CH_2CH_2COOH$) with polyhydroxy compounds such as glycols, triols, tetrols, pentaols, hexaols, and mixtures thereof. Other non-limiting examples of suitable polythiols include ethylene glycol bis (thioglycolate), ethylene glycol bis((3-mercaptopropionate), trimethylolpropane tris (thioglycolate), trimethylolpropane tris ((3-mercaptopropionate), pentaerythritol tetrakis (thioglycolate) and pentaerythritol tetrakis ((3-mercaptopropionate), and mixtures thereof.

Suitable polyacids and polyols useful as curing agents include any of those known in the art, such as those described herein for the making of polyesters.

Appropriate mixtures of crosslinking agents may also be used in the invention.

The amount of curing agent (b) in the curable film-forming composition generally ranges from 5 to 75% by weight, based on the total weight of solids in the curable film-forming composition. For example, the minimum amount of cros slinking agent may be at least 5% by weight, often at least 10% by weight and more often, at least 15% by weight, based on the total weight of solids in the curable film-forming composition. The maximum amount of crosslinking agent may be 75% by weight, more often 60% by weight, or 50% by weight, based on the total weight of solids in the curable film-forming composition. Ranges of crosslinking agent may include, for example, 5 to 50% by weight, 5 to 60% by weight, 10 to 50% by weight, 10 to 60% by weight, 10 to 75% by weight, 15 to 50% by weight, 15 to 60% by weight, and 15 to 75% by weight, based on the total weight of solids in the curable film-forming composition.

The resin component (a) may comprise epoxide functional groups and the curing agent component (b) may comprise amine functional groups. For example, the coating composition may comprise, consist essentially of, or consist of a film-forming binder comprising a resin component comprising epoxide functional groups, curing agent comprising amine functional groups, an organic solvent, and at least one of the corrosion inhibitors discussed above.

Further Components of the Coating Compositions

The coatings compositions of the present invention may comprise additional optional components.

For example, the electrodepositable coating compositions according to the present invention may optionally comprise one or more further components in addition to the ionic salt group-containing film-forming polymer and the curing agent described above.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at and include, but are not limited to, ammonium hexafluoroantimonate, quaternary salts of $SbF_6$ (e.g., NACURE® XC-7231), t-amine salts of SbF6 (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating composition may comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion may be expressed as the pigment-to-resin weight ratio, and may be within the range of 0.03 to 0.6, when pigment is used. The other additives mentioned above may be present in the electrodepositable coating composition in amounts of 0.01% to 3% by weight, based on total weight of the resin solids of the electrodepositable coating composition.

According to the present invention, the electrodepositable coating composition may comprise water and/or one or more organic solvent(s). Water can for example be present in amounts of 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 15 minutes.

The non-electrodepositable coating composition according to the present invention may optionally comprise one or more further components in addition to the organic resin component, the curing agent component, and corrosion inhibitor described above.

The curable film-forming compositions of the present invention may further comprise one or more additional corrosion inhibitors.

A suitable additional corrosion inhibitor used according to the present invention is magnesium oxide (MgO). Any MgO of any number average particle size can be used according to the present invention. The number average particle size may be determined by visually examining a micrograph of a transmission electron microscopy ("TEM") image as described below. For example, the MgO may be micron sized, such as 0.5 to 50 microns or 1 to 15 microns, with size based on average particle size. Alternatively, or in addition, the MgO may be nano sized, such as 10 to 499 nanometers, or 10 to 100 nanometers, with size based on number average particle size. It will be appreciated that these particle sizes refer to the particle size of the MgO at the time of incorporation into the curable film-forming composition. Various coating preparation methods may result in the MgO particles agglomerating, which could increase average particle size, or shearing or other action that can reduce average particle size. MgO is commercially available from a number of sources.

Ultrafine MgO particles may be used in the corrosion inhibitor (2). As used herein, the term "ultrafine" refers to particles that have a B.E.T. specific surface area of at least 10 square meters per gram, such as 30 to 500 square meters per gram, or, in some cases, 80 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The curable film-forming compositions of the present invention may comprise MgO particles having a calculated equivalent spherical diameter of no more than 200 nanometers, such as no more than 100 nanometers, or, for example, 5 to 50 nanometers. As will be understood by those skilled in the art, a calculated equivalent spherical diameter can be determined from the B.E.T. specific surface area according to the following equation: Diameter (nanometers)=6000/[BET (m.sup.2/g)*.rho. (grams/cm.sup.3)].

Often the MgO particles have a number average primary particle size of no more than 100 nanometers, such as no more than 50 nanometers, or no more than 25 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The shape (or morphology) of the MgO particles can vary. For example, generally spherical morphologies can be used, as well as particles that are cubic, platy, polyhedric, or acicular (elongated or fibrous). The particles may be covered completely in a polymeric gel, not covered at all in a polymeric gel, or covered partially with a polymeric gel. Covered partially with a polymeric gel means that at least some portion of the particle has a polymeric gel deposited thereon, which, for example, may be covalently bonded to the particle or merely associated with the particle.

The amount of MgO, if used in the curable film-forming composition, can vary. For example, the curable film-forming composition can comprise 1 to 50 percent by weight MgO particles, with minimums, for example, of 1 percent by weight, or 5 percent by weight, or 10 percent by weight, and maximums of 50 percent by weight, or 40 percent by weight. Exemplary ranges include 5 to 50 percent by weight, 5 to 40 percent by weight, 10 to 50 percent by weight and 10 to 40 percent by weight, with percent by weight based on the total weight of all solids, including pigments, in the curable film-forming composition. The amount of MgO, if used, may be higher than the amount of any other corrosion inhibitor used in the composition, such as higher than any other inorganic corrosion inhibitor and/or any other corrosion inhibitor, and may be higher than any corrosion inhibitor that is in an adjacent coating layer.

Amino acid(s) are also suitable additional corrosion inhibitors according to the present invention. Amino acids will be understood by those skilled in the art as compounds having both acid and amine functionality, with side chains specific to each amino acid. The amino acid may be monomeric or oligomeric, including a dimer. When an oligomeric amino acid is used, the molecular weight, as determined by GPC, of the oligomer is often less than 1000.

Particularly suitable amino acids are histidine, arginine, lysine, cysteine, cystine, tryptophan, methionine, phenylalanine and tyrosine. Mixtures may also be used. The amino acids can be either L- or D-enantiomers, which are mirror images of each other, or mixtures thereof. The L-configurations are typically found in proteins and nature and as such are widely commercially available. The term "amino acids" as used herein therefore refers to both the D- and L-configurations; it is foreseen that only the L- or only the D-configuration may be included. Amino acids can be purchased, for example, from Sigma Aldrich, Thermo Fisher Scientific, Hawkins Pharmaceutical, or Ajinomato. Often the amino acids glycine, arginine, proline, cysteine and/or methionine are specifically excluded.

The amino acid can be present in any amount that improves the corrosion resistance of the coating. For example, the amino acid may be present in an amount of 0.1 to 20 percent by weight, such as at least 0.1 percent by weight or at least 2 percent by weight and at most 20 percent by weight or at most 4 percent by weight; exemplary ranges include 0.1 to 4 percent by weight, 2 to 4 percent by weight, or 2 to 20 percent by weight, based on the total weight of resin solids in the curable film-forming composition.

An azole may also be a suitable additional corrosion inhibitor. Examples of suitable azoles include benzotriazoles such as 5-methyl benzotriazole, tolyltriazole, 2,5-dimercapto-1,3,4-thiadiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7h-imidazo (4,5-d)pyrimidine, and 2-amino thiazole. Salts of any of the foregoing, such as sodium and/or zinc salts, are also suitable. Additional azoles include 2-hydroxybenzothiazole, benzothiazole, 1-phenyl-4-methylimidazole, and 1-(p-tolyl)-4-methlyimidazole. A suitable azole-containing product is commercially available from WPC Technologies, as HYBRICOR 204, Hybricor 204S, and Inhibicor 1000. Mixtures of azoles may also be used. Typically, the azole is present in the curable film-forming composition, if used, in amounts as low as 0.1 percent, such as 0.1 to 25 percent by weight, based on total weight of resin solids in the curable film-forming composition.

Lithium-based compounds are also another suitable additional corrosion inhibitor. Lithium-based compounds can be used, for example, in salt form, such as an organic or inorganic salt. Examples of suitable lithium salts include but are not limited to lithium carbonate, lithium phosphate, lithium sulphate, and lithium tetraborate. Other lithium compounds include but are not limited to lithium silicate including lithium orthosilicate ($Li_4SiO_4$), lithium metasilicate ($Li_2SiO_3$), lithium zirconate, and lithium-exchanged silica particles. Curable film-forming compositions of the present invention may also exclude lithium compounds, such as lithium salt and/or lithium silicate; that is the coating compositions of the present invention may be substantially free of any of the lithium compounds described above. As used in this context, substantially free means the lithium compound, if present at all, is only present in trace amounts, such as less than 0.1 weight percent of lithium based on the total solid weight of the coating composition. If used, a lithium compound can be used in amounts of 0.1 to 4.5 percent of lithium by weight, based on the total weight of resin solids in the curable film-forming composition.

The curable film-forming compositions of the present invention, comprising (1) a curable, organic film-forming binder component (i.e., (a) a resin component and (b) a curing agent component) and (2) a corrosion inhibitor, may be provided and stored as one-package compositions prior to use. A one-package composition will be understood as referring to a composition wherein all the coating components are maintained in the same container after manufacture, during storage, etc. A typical one-package coating can be applied to a substrate and cured by any conventional means, such as by heating, forced air, radiation cure and the like. For some coatings, such as ambient cure coatings, it is not practical to store them as a one-package, but rather they must be stored as multi-package coatings to prevent the components from curing prior to use. The term "multi-package coatings" means coatings in which various components are maintained separately until just prior to application. The present coatings can also be multi-package coatings, such as a two-package coating.

Thus, the components (a) and (b) may be provided as a one-package (1K) or multi-package, such as a two-package (2K) system. The components of the organic film-forming binder (1) are often provided in separate packages and mixed together immediately prior to the reaction. When the reaction mixture is a multi-package system, the corrosion inhibitor (2) may be present in either one or both of the separate components (a) and (b) and/or as an additional separate component package.

The curable film-forming composition of the present invention may additionally include optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used, they are typically present in the composition in an amount of 0.1 to 2 percent by weight, based on the total weight of resin solids in the film-forming composition. Other optional additives may be included such as colorants, plasticizers, abrasion-resistant particles, film strengthening particles, flow control agents, thixotropic agents, rheology modifiers, fillers, catalysts, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof. The term "colorant", as used herein is as defined in U.S. Patent Publication No. 2012/0149820, paragraphs 29 to 38, the cited portion of which is incorporated herein by reference.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles.

As used herein, the terms "adhesion promoter" and "adhesion promoting component" refer to any material that, when included in the composition, enhances the adhesion of the coating composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming composition of the present invention may also comprise alkoxysilane adhesion promoting agents, for example, acryloxyalkoxysilanes, such as y-acryloxypropyltrimethoxysilane and methacrylatoalkoxysilane, such as y-methacryloxypropyltrimethoxysilane, as well as epoxy-functional silanes, such as y-glycidoxypropyltrimethoxysilane. Exemplary suitable alkoxysilanes are described in U.S. Pat. No. 6,774,168 at column 2, lines 23 to 65, the cited portion of which is incorporated by reference herein.

The adhesion promoting component, if used, is usually present in the coating composition in an amount ranging from 0.05 to 20 percent by weight, such as at least 0.05 percent by weight or at least 0.25 percent by weight, and at most 20 percent by weight or at most 15 percent by weight, with ranges such as 0.05 to 15 percent by weight, 0.25 to 15 percent by weight, or 0.25 to 20 percent by weight, with the percentages by weight being based on the total weight of resin solids in the composition.

The coating compositions of the present invention may also comprise, in addition to any of the previously described corrosion inhibiting compounds, any other corrosion resisting particles including, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX AC3 and/or SHIELDEX. C303. Suitable amorphous silica is available from W. R. Grace & Co. as SYLOID. Suitable zinc hydroxyl phosphate is commercially available from Elementis Specialties, Inc. as NALZIN. 2. These particles, if used, may be present in the compositions of the present invention in an amount ranging from 5 to 40 percent by weight, such as at least 5 percent by weight or at least 10 percent by weight, and at most 40 percent by weight or at most 25 percent by weight, with ranges such as 10 to 25 percent by weight, with the percentages by weight being based on the total solids weight of the composition.

The curable film-forming compositions of the present invention may comprise one or more solvents including water and/or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50 wt % of the solvent is water. For example, less than 10 wt %, or even less than 5 wt % or 2 wt %, of the solvent can be water. It will be understood that mixtures of solvents, including water in an amount of less than 50 wt % or containing no water, can constitute a "non-aqueous solvent". The composition may be aqueous or water-based. This means that more than 50 wt % of the solvent is water. Such compositions have less than 50 wt %, such as less than 20 wt %, less than 10 wt %, less than 5 wt % or less than 2 wt % of organic solvent(s).

Substrates

According to the present invention, the coating composition may be applied to a substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, GALVANNEAL steel, nickel-plated steel, and steel plated with zinc alloy. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. The substrate may comprise aluminum, aluminum alloys, zinc-aluminum alloys such as GALFAN, GALVALUME, aluminum plated steel, and aluminum alloy plated steel substrates. Non-limiting examples of aluminum alloys include the 1XXX, 2XXX, 3XXX, 4XXX, 5XXX, 6XXX, or 7XXX series, such as 2024, 7075, 6061 as particular examples, as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate used in the present invention may also comprise other suitable non-ferrous metals such as titanium or copper, as well as alloys of these materials. The substrate may also comprise more than one metal or metal alloy in that the substrate may be a combination of two or more metal substrates assembled together such as hot-dipped galvanized steel assembled with aluminum substrates.

Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. The substrate may comprise a vehicle or a portion or part thereof. The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; drones, aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft. The aqueous resinous dispersion may be utilized to coat surfaces and parts thereof. A part may include multiple surfaces. A part may include a portion of a larger part, assembly, or apparatus. A portion of a part may be coated with the aqueous resinous dispersion of the present invention or the entire part may be coated.

The metal substrate may be in the shape of a cylinder, such as a pipe, including, for example, a cast iron pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a solgel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution. The substrate may be new (i.e., newly constructed or fabricated) or it may be refurbished, such as, for example, in the case of refinishing or repairing a component of an automobile or aircraft.

Methods of Coating, Coatings and Coated Substrates

The present invention is also directed to methods for coating a substrate, such as any one of the electroconductive substrates mentioned above. According the present invention such method may comprise electrophoretically applying an electrodepositable coating composition as described above to at least a portion of the substrate and curing the coating composition to form an at least partially cured coating on the substrate. According to the present invention, the method may comprise (a) electrophoretically depositing onto at least a portion of the substrate an electrodepositable coating composition of the present invention and (b) heating the coated substrate to a temperature and for a time sufficient to cure the electrodeposited coating on the substrate. According to the present invention, the method may optionally further comprise (c) applying directly to the at least partially cured electrodeposited coating one or more pigment-containing coating compositions and/or one or more pigment-free coating compositions to form a top coat over at least a portion of the at least partially cured electrodeposited coating, and (d) heating the coated substrate of step (c) to a temperature and for a time sufficient to cure the top coat.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating formed by at least partially curing the coating applied from the coating composition described herein.

The present invention is further directed to a substrate that is coated, at least in part, with the coating composition described herein in an at least partially cured state.

The coating compositions of the present invention may be utilized in an layer that is part of a multi-layer coating composite comprising a substrate with various coating layers. The coating layers may include a pretreatment layer, such as a phosphate layer (e.g., zinc phosphate layer), a coating layer which results from the coating composition of the present invention. The coating layer may be a primer or a top coat layer(s) (e.g., base coat, clear coat layer, pigmented monocoat, and color-plus-clear composite compositions), and the multi-layer coating composition may optionally comprise such primer and top coat layer(s) in addition to the coating layer derived from the coating composition of the present invention. It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. According to the present invention, the primer layer may be disposed between the coating layer and the base coat layer. According to the present invention, one or more of the topcoat layers may be applied onto a substantially uncured underlying layer. For example, a clear coat layer may be applied onto at least a portion of a substantially uncured basecoat layer (wet-on-wet), and both layers may be simultaneously cured in a downstream process.

Moreover, the top coat layers may be applied directly onto the coating layer. In other words, the substrate lacks a primer layer. For example, a basecoat layer may be applied directly onto at least a portion of the coating layer.

It will also be understood that the top coat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

The coating composition of the present invention may be applied directly to the metal substrate when there is no intermediate coating between the substrate and the curable film-forming composition. By this is meant that the substrate may be bare, as described below, or may be treated with one or more cleaning, deoxidizing, and/or pretreatment compositions as described below, or the substrate may be anodized. Alternatively, the substrate may be coated with one or more different coating compositions prior to application of the coating composition of the present invention. The additional coating layers may comprise solgels, adhesion promoters, primers, wash primers, basecoats, or topcoats, and may be applied by any method known in the art, such as, for example, dip, roll, spray, brush, or electrodeposition.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products, and any of the DFM Series, RECC 1001, and 88X1002 cleaners commercially available from PRC-DeSoto International, Sylmar, CA), and Turco 4215-NCLT and Ridolene (commercially available from Henkel Technologies, Madison Heights, MI). Such cleaners are often preceded or followed by a water rinse, such as with tap water, distilled water, or combinations thereof. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating and/or curable film-forming composition of the present invention to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, MI), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

The metal substrate may optionally be pickled by treatment with solutions comprising nitric acid and/or sulfuric acid.

The metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics,* 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as BONDERITE M-CR1200 from Henkel, and trivalent chromium types, such as BONDERITE M-CR T5900 from Henkel.

The coating composition of the present invention may be applied to the substrate using conventional techniques. The use of a spray-applied or electrodeposited primer or primer-surfacer under the coating composition of the present invention may be unnecessary when using the composition of the present invention.

The coating compositions of the present invention may be used alone such as a unicoat, or monocoat, layer and/or may be used as part of a multi-layer coating system. For example, the compositions of the present invention may be used as primers, basecoats, and/or topcoats. Thus the present invention is further directed to a multilayer coated metal substrate. Such a multilayer coated substrate comprises:

(a) a metal substrate;

(b) a first curable film-forming composition applied to at least a portion of said metal substrate; and (c) a second curable film-forming composition applied to at least a portion of the first curable film-forming composition, wherein the first curable film-forming composition, the second curable film-forming composition or both comprise a corrosion inhibitor. For example, the first curable film-forming composition described above can be a primer coating applied to the substrate and the second curable film-forming composition is a topcoat composition; the corrosion inhibitor can be in either the first or second curable film-forming compositions or in both. One or more additional corrosion inhibitors can also be present in either the first or second curable film-forming compositions or both.

The coating compositions of the present invention may be used as corrosion resistant primers. As indicated, the present invention may be directed to metal substrate primer coating compositions, such as "etch primers." As used herein, the term "primer coating composition" refers to coating compositions from which an undercoating may be deposited onto a substrate. In some industries or on certain substrates, the primer is applied to prepare the surface for application of a protective or decorative coating system. In other industries or substrates, another coating layer is not applied on top of the primer. For example, substrate surfaces that have limited or no external exposure might have a primer with no other layer on top. As used herein, the term "etch primer" refers to primer coating compositions that include an adhesion promoting component, such as a free acid as described in more detail above.

Suitable top coats (base coats, clear coats, pigmented monocoats, and color-plus-clear composite compositions) include any of those known in the art, and each may be waterborne, solventborne or powdered. The top coat typically includes a film-forming resin, crosslinking material and pigment (in a colored base coat or monocoat). Non-limiting examples of suitable base coat compositions include waterborne base coats such as are disclosed in U.S. Pat. Nos. 4,403,003; 4,147,679; and 5,071,904. Suitable clear coat compositions include those disclosed in U.S. Pat. Nos. 4,650,718; 5,814,410; 5,891,981; and WO 98/14379.

In this multilayer coated metal substrate of the present invention, the metal substrate may be any of those disclosed above. Likewise, each of the first and second curable film-forming compositions may independently comprise any of the curable, organic film-forming compositions disclosed above. Moreover, for example, in this multilayer coated metal substrate, the curable film-forming composition may be a primer coating applied to the substrate and the second coating layer, applied on top of the first curable film-forming composition, may be a topcoat composition. The first curable film-forming composition may be a primer coating and the second coating layer may be a second primer, such as a primer surfacer. The first curable film-forming composition may be an electrodepositable coating layer and the second coating layer may be a primer or a topcoat.

The coating compositions of the present invention may be applied to a substrate by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used.

After application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time. The thickness of the coating is usually from 0.1 to 3 mils (2.5 to 75 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step. Additionally, the first coating composition may be applied and then a second applied thereto "wet-on-wet". Alternatively, the first coating composition can be cured before application of one or more additional coating layers.

The present invention is further directed to a coating formed by at least partially curing the coating composition described herein.

The present invention is further directed to a substrate that is coated, at least in part, with the coating composition described herein. The coating may be in an at least partially or fully cured state.

Coated metal substrates of the present invention may demonstrate excellent corrosion resistance as determined by salt spray corrosion resistance testing.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" ionic salt group-containing film-forming polymer, "a" curing agent, "a" monomer, a combination (i.e., a plurality) of these components may be used. In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples, which, however, are not to be considered as limiting the invention to their details. Unless otherwise indicated, all parts and percentages in the following examples, as well as throughout the specification, are by weight.

EXAMPLES

Solution Electrochemistry

Potential corrosion inhibitors may be tested using solution electrochemistry techniques in order to determine whether they might provide corrosion protection to an underlying substrate. The testing may be performed as follows: Aluminum alloys of 2024-T3 could be used for all solution electrochemistry experiments. The panels could first cleaned using a methyl ethyl ketone (MEK) wipe. Panels could then be immersed in BONDERITE® C-AK 298 ALKALINE CLEANER (previously known as Ridoline® 298 and commercially available from Henkel) for 2 minutes at 130° F. followed by a 1 minute immersion in tap water and a spray rinse of tap water. The panels could then be immersed in a deoxidizing bath consisting of BONDERITE® C-IC DEOXDZR 6MU AERO/BONDERITE® C-IC DEOXDZR 16R AERO (previously known as Turco® Deoxidizer 6 Makeup and Turco® Deoxidizer 16 Replenisher, both commercially available from Henkel) for 2'30" at ambient conditions; followed by a 1 minute immersion in tap water and finally a spray rinse of deionized water. Each sample can be evaluated for Linear Polarization Resistance and Window of Passivity.

Linear Polarization Resistance: Individual linear polarization scans can be conducted in an aqueous solution of 50 mM NaCl with a concentration of inhibiting compound, ranging from 0.25 to 1 mM. Scans can be carried out after a 10 minute period at the open circuit potential, followed by a ramp from −0.02 to 0.02 $V_{OCP}$ at 1 mV/s using a standard calomel reference electrode and a platinum counter electrode. The above prepared aluminum alloys of 2024-T3 sample could used as the working electrode for each replicate test with an exposed working electrode test area of 2.8 cm 2 exposed to a solution for each replicate test. At least four scans can be performed for each inhibiting compound. The polarization resistance (Rp) is taken as the slope of the potential vs. current density plot. Scans in neat 50 mM NaCl solution can be taken as the control, and exhibit, for example, an average Rp value of 28 $k\Omega^*cm^2$. Inhibiting compounds that gave Rp values higher than 28 $k\Omega^*cm^2$ would be considered to have a slower corrosion rate than the control. This test is referred to herein as the LINEAR POLARIZATION RESISTANCE TEST METHOD.

Window of Passivity: Individual anodic polarization scans can be conducted in an aqueous solution of 50 mM NaCl with a concentration of inhibiting compound, ranging from 0.25 to 1 mM. Scans can be carried out after a 10 minute period at the open circuit potential, followed by a ramp from −0.02 to 0.3 $V_{OCP}$ at 1 mV/s using a standard calomel reference electrode and a platinum counter electrode. The above prepared aluminum alloys of 2024-T3 sample were used as the working electrode for each replicate test with an exposed working electrode test area of 2.8 cm 2 exposed to a solution for each replicate test. At least duplicate scans can be performed for each inhibiting compound. The window of passivity is taken as the difference between the breakdown potential and the open circuit potential. Scans in neat 50 mM NaCl aqueous solution could be taken as the control and exhibit, for example, an average passive window of 28 mV. Inhibiting compounds resulting in passive windows higher than 28 mV would be considered to provide better corrosion protection than the control. This test is referred to herein as the PASSIVE WINDOW TEST METHOD.

Corrosion inhibitors solutions that tested with a polarization resistance (Rp) higher than 28 $k\Omega^*cm^2$ and a passive window greater than 28 mV would be expected to provide corrosion resistance over 2024-T3 aluminum substrates. The following corrosion inhibitors satisfied both conditions:

| Compound | Passive Window (mv) | Linear polarization resistance ($k\Omega^*cm^2$) |
|---|---|---|
| NaCl (control) | 28 ± 0 | 28 ± 6 |
| Cure Rite 18 Morpholin-4-yl morpholine-4-carbodithioate | 421 ± 19 | 110 ± 20 |
| Vanax TMTM, Tetramethylthiuram monosulfide | 189 ± 13 | 160 ± 66 |
| 1,4-Di-tert-butyl piperazine-1,4-dicarboxylate | 187 ± 63 | 130 ± 70 |

The following corrosion inhibitors failed to satisfy one or both of the tests:

| Compound | Passive Window (mv) | Linear polarization resistance ($k\Omega^*cm^2$) |
|---|---|---|
| NaCl (control) | 28 ± 0 | 28 ± 6 |
| Neocuporine | 0 | 28 ± 4 |

Spray Primer Examples

TABLE 1 below provides a description of materials used in preparation of the examples:

| Component | Description | Supplier |
|---|---|---|
| Ancamide ® 2569 | Polyamide curing agent | Evonik |
| Ancamine ® 2432 | Polyamine curing agent | Evonik |
| Ancamine ® K54 | Catalyst | Evonik |
| Ti-Pure ® R-706-11 | Titanium Dioxide | DuPont |
| Epon ® 828 | Bisphenol A/epichloro-hydrin resin | Momentive |
| Epon ® 8111 | Modified Epoxy resin | Momentive |
| Silquest ® A187 | Epoxy-silane | Momentive |
| Acematt ® OK-412 | Silicon Dioxide | Evonik |
| Milling media | Part #74582 minimum 85% $Al_2O_3$ (16 to 20 mesh) | Coors Tek |
| BONDERITE ® C-AK 298 | Alkaline Immersion Cleaner | Henkel |
| BONDERITE ® C-IC DEOXDZR 6MU AERO/ BONDERITE ® C-IC DEOXDZR 16R AERO | Deoxidizer | Henkel |
| Cure-Rite 18 | Morpholin-4-yl morpholine-4-carbodithioate | AkroChem, Inc. |
| Vanax TMTM | Tetramethylthiuram monosulfide | Vanderbilt Chemicals, LLC |
| Tert-butyl 4-benzylpiperazine-1-carboxylate | | AmBeed |

TABLE 2

Primer Coating Examples:

| Material | Comp Ex 1 | Ex 2 | Ex 3 | Ex 4 |
|---|---|---|---|---|
| Component A | g | g | g | g |
| Ancamide 2569 | 11.3 | 11.3 | 11.3 | 11.3 |
| Ancamine 2432 | 7.5 | 7.5 | 7.5 | 7.5 |
| Ancamine K-54 | 0.6 | 0.6 | 0.6 | 0.6 |
| N-butyl alcohol | 13.2 | 13.2 | 13.2 | 13.2 |
| Butyl Acetate | 14.9 | 14.9 | 14.9 | 14.9 |
| Xylene | 1.2 | 1.2 | 1.2 | 1.2 |
| Ti-Pure R-706-11 | 21.2 | 21.2 | 21.2 | 21.2 |
| Acematt OK-412 | 2.1 | 2.1 | 2.1 | 2.1 |
| Total | 72.0 | 72.0 | 72.0 | 72.0 |
| Component B | g | g | g | g |
| Epon 828 | 23.6 | 23.6 | 23.6 | 23.6 |
| Epon 8111 | 3.8 | 3.8 | 3.8 | 3.8 |
| Xylene | 0.7 | 0.7 | 0.7 | 0.7 |
| Butyl Acetate | 13.9 | 13.9 | 13.9 | 13.9 |
| Methyl Acetate | 7.7 | 7.7 | 7.7 | 7.7 |
| Ti-Pure R-706-11 | 19.1 | 19.1 | 19.1 | 19.1 |
| Cure-Rite 18 | 0 | 8.5 | 0 | 0 |

TABLE 2-continued

| Primer Coating Examples: | | | | |
|---|---|---|---|---|
| Material | Comp Ex 1 | Ex 2 | Ex 3 | Ex 4 |
| Vanax TMTMS | 0 | 0 | 8.5 | 0 |
| Tert-Butyl 4-benzylpiperazine-1-carboxylate | 0 | 0 | 0 | 8.5 |
| Silquest A-187 | 0.7 | 0.7 | 0.7 | 0.7 |
| Total | 69.5 | 78.0 | 78.0 | 78.0 |
| Total Blended Weight | 141.5 | 150.0 | 150.0 | 150.0 |

Coating Examples 1 through 4 were prepared as follows: For Component A of each example, all materials were weighed and placed into glass jars. Dispersing media was then added to each jar at a level equal to approximately one-half the total weight of the component materials. The jars were sealed with lids and then placed on a Lau Dispersing Unit with a dispersion time of 3 hours. For Component B of each example, all materials with the exception of the Silquest A-187 were weighed and placed into glass jars. Dispersing media was then added to each jar at a level equal to approximately one-half the total weight of the component materials. The jars were sealed with lids and then placed on a Lau Dispersing Unit with a dispersion time of 3 hours. The Silquest A-187 was added to the Component B mixtures after the pigment dispersion process was completed. Each final Component B mixture was then thoroughly mixed.

The coatings of Examples 1 through 4 were spray applied onto 2024T3 bare aluminum alloy substrate panels to a dry film thickness of between 1.0 to 1.5 mils using an air atomized spray gun. Prior to coating application, the panels were first cleaned using a methyl ethyl ketone (MEK) wipe. Panels were then immersed in BONDERITE® C-AK 298 ALKALINE CLEANER (previously known as Ridoline® 298 and commercially available from Henkel) for 2 minutes at 130° F. followed by a 1 minute immersion in tap water and a spray rinse of tap water. The panels were then immersed in a deoxidizing bath consisting of BONDERITE® C-IC DEOXDZR 6MU AERO/BONDERITE® C-IC DEOXDZR 16R AERO (previously known as Turco® Deoxidizer 6 Makeup and Turco® Deoxidizer 16 Replenisher, both commercially available from Henkel) for 2'30" at ambient conditions; followed by a 1 minute immersion in tap water and finally a spray rinse of deionized water. The panels were allowed to dry under ambient conditions for at least 2 hours prior to spray application.

The fully coated test panels coated with coating Examples 1 through 4 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 3 were at 504 hours of exposure. The panels were rated according to the following scale:

Scribe Corrosion: Rating is 0 to 100 and number represents percent of scribe area showing visible corrosion. The value is the average of two replicates. The lower the number, the less visible corrosion and better corrosion performance.

Shiny/Nature of Scribe: Rating is 0-100 and number represents percent of scribe which is dark/tarnished scribe. The value is the average of two replicates. The lower the number, the better the performance.

TABLE 3

| Corrosion Test Results for Examples 1-4: | | | |
|---|---|---|---|
| | | Al 2024-T3 Bare | |
| Example # | Description | Scribe Corr. | Scribe Shine |
| Comp Ex 1 | Primer Control | 25 | 90 |
| Ex 2 | Primer with Cure-Rite 18 | 10 | 85 |
| Ex 3 | Primer with Vanax TMTMS | 15 | 85 |
| Ex 4 | Primer with tert-butyl 4-benzylpiperazine-1-carboxylate | 10 | 90 |

The corrosion data in TABLE 3 shows an improvement in scribe corrosion for Examples 2 through 4 when compared to the Comparative Example 1. The scribe shine of the three examples (2 through 4) are equal to or better than the comparative example also.

Electrodepositable Coating Composition Examples

Example 5: Preparation of Hydroxypropylcarbamate Half-Capped Isophoronediisocyanate (IPDI) Reactant: A general procedure for making a hydroxypropylcarbamate half-capped isophoronediisocyanate was performed as follows:

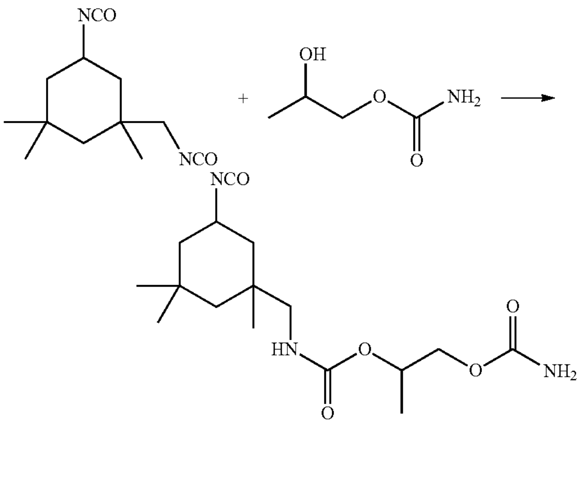

| Charge # | Material | Amount (g) |
|---|---|---|
| 1 | Isophoronediisocyanate | 1112.0 |
| 2 | Methyl isobutyl ketone | 537.8 |
| 3 | Dibutyltindilaurate | 1.7 |
| 4 | Carbalink HPC (95%)[1] | 626.8 |

[1]Hydroxypropylcarbamate. Available commercially as 'Carbalink HPC' from Huntsman Charges 1-3 were added to a flask set up for total reflux with stirring under nitrogen. The mixture was heated to a temperature of 60° C. Charge 4 was added over 2 hours through an addition funnel while the resulting exotherm was maintained under 70° C. After 2 hours, the mixture was titrated for isocyanate (NCO) equivalent weight and found to have a value of 463 g/eq of NCO (theoretical of 456 g/eq). The mixture was then cooled to 40° C. and poured out. Final solids were 75.6%. The solids content was determined by adding a quantity of the dispersion to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of the examples below. Final z-average molecular weight (Mz) of the resin was determined to be 674 g/mol. The molecular weight was determined by Gel Permeation Chromatography using Waters 2695 separation module with a Waters 410 differential refractometer (RI detector), polystyrene standards having molecular weights of from approximately 500 g/mol to 900,000 g/mol, tetrahydrofuran (THF) with lithium bromide (LiBr) as the eluent at a flow rate of 0.5 mL/min, and one Asahipak GF-510 HQ column for separation. This procedure was used in each of the examples below.

Comparative Example 6—Preparation of a Carbamate-Functional Phosphated Epoxy Resin without Corrosion Inhibitor: A procedure for making a carbamate-functional phosphated epoxy resin without corrosion inhibitor was performed as follows:

| Charge # | Material | Amount (g) |
|---|---|---|
| 1 | Bisphenol-A Diglycidyl Ether | 491.7 |
| 2 | Bisphenol-A | 158.4 |
| 3 | Butyl carbitol formal | 20.1 |
| 4 | Ethyltriphenylphosphonium Bromide | 0.4 |
| 5 | Methyl isobutyl ketone | 94.6 |
| 6 | Dibutyltindilaurate | 0.9 |
| 7 | Hydroxypropylcarbamate half-capped isophoronediisocyanate from Example 5 | 283.9 |
| 8 | Butyl CELLOSOLVE[2] | 101.2 |
| 9 | 2-Ethyl-1-hexanol | 94.4 |
| 10 | 85% Phosphoric Acid | 23.3 |
| 11 | Phenylphosphonic Acid | 21.3 |
| 12 | Ektasolve EEH[3] | 156.5 |
| 13 | Deionized water | 50.6 |
| 14 | Diisopropanolamine | 80.9 |
| 15 | Cymel 1130[4] | 328.9 |
| 16 | Deionized water | 623.3 |
| 17 | Deionized water | 1855.5 |
| 18 | Deionized water | 400.0 |

[2]2-Butoxyethanol available from Dow Chemical Company

[3]Ethylene glycol 2-ethylhexyl ether available from Eastman Chemical Company

[4]Cymel 1130 a methylated/n-butylated melamine-formaldehyde crosslinker available from Allnex Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 80° C. When 80° C. was reached, charge 6 was added followed by charge 7 over 1 hour. After 1 hour, residual NCO was checked by IR and none remained. The mixture was then warmed to 90° C. When 90° C. was reached, charges 8-9 were added followed by charges 10-12 (predissolved at ambient temperature). The mixture was allowed to exotherm and the temperature was adjusted to 120° C. The mixture was held at that temperature for 30 minutes, then cooled to 100° C. Charge 13 was added slowly and the mixture was held at 100° C. for 1 hour, then cooled to 90° C. Charge 14 was added followed by charge 15. The mixture was stirred for 30 minutes as the temperature was readjusted to 90° C. The resulting mixture was then reverse thinned into charge 16, which was at ambient temperature, and held for 30 minutes. Charge 17 was then added and held for 30 minutes. Charge 18 was then added and held for 30 min. Following the final hold time, the flask set-up was switched to total distillation and the mixture was placed under 21-22 inches of vacuum. The temperature was increased to 55° C. and the mixture was stripped until methyl isobutyl ketone was less than 0.1% as determined by gas chromatography. Final solids were 31.4%. Final z-average molecular weight of the resin was 234,329 g/mol.

Example 7—Preparation of a Methylated Melamine-Formaldehyde Curing Agent Comprising High Molecular Weight Volatile Groups: A procedure for making a Butyl CARBITOL-modified curing agent was performed as follows:

| Charge # | Material | Amount (g) |
|---|---|---|
| 1 | Cymel 303[1] | 994.9 |
| 2 | Butyl CARBITOL | 1215.0 |
| 3 | Phenyl phosphonic acid | 5.0 |

[1]Cymel 303 is a methylated melamine-formaldehyde curing agent available from Allnex Charges 1-3 were added to a flask set up for total distillation with stirring under nitrogen. The mixture was heated to reflux and remained there for 2 hours until methanol distillate stalled. After 240.4 mL of total distillate volume evolved, the mixture was cooled to 40° C. and poured out.

Example 8—Preparation of a Carbamate-Functional Phosphated Epoxy Resin with Corrosion Inhibitor and Curing Agent with High Molecular Weight Volatile Groups: A procedure for making a carbamate-functional phosphated epoxy resin with 20% by weight morpholin-4-yl morpholine-4-carbodithioate (Cure Rite 18) corrosion inhibitor and a curing agent comprising high molecular weight volatile groups (BuCarb-modified curing agent) was performed as follows:

| # | Material | Amount (g) |
|---|---|---|
| 1 | Bisphenol-A Diglycidyl Ether | 116.8 |
| 2 | Bisphenol-A | 37.6 |
| 3 | Butyl carbitol formal | 4.8 |
| 4 | Ethyltriphenylphosphonium Bromide | 0.10 |
| 5 | Methyl isobutyl ketone | 22.5 |
| 6 | Dibutyltindilaurate | 0.23 |
| 7 | Hydroxypropylcarbamate half-capped isophoronediisocyanate from Ex. 5 | 72.4 |
| 8 | Butyl Cellosolve | 24.0 |
| 9 | 2-Ethyl-1-hexanol | 22.4 |
| 10 | 85% Phosphoric Acid | 5.5 |
| 11 | Phenylphosphonic Acid | 5.1 |
| 12 | Ektasolve EEH | 37.2 |
| 13 | Deionized water | 12.0 |
| 14 | Diisopropanolamine | 19.2 |
| 15 | BuCarb modified crosslinker from Ex. 7 | 238.7 |
| 16 | Morpholin-4-yl morpholine-4-carbodithioate[1] | 119.4 |
| 17 | Deionized water | 360.7 |
| 18 | Deionized water | 740.7 |
| 19 | Deionized water | 76.0 |

[1]Commercially available as Cure Rite 18.

Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 80° C. When 80° C. was reached, charge 6 was added followed by charge 7 over 1 hour. After 1 hour, residual NCO was checked by IR and none remained. The mixture was then warmed to 90° C. When 90° C. was reached, charges 8-9 were added followed by charges 10-12 (predissolved at ambient temperature). The mixture was allowed to exotherm and the temperature was adjusted to 120° C. The mixture was held at that temperature for 30 minutes, then cooled to 100° C. Charge 13 was added slowly and the mixture was held at 100° C. for 1 hour, then cooled to 90° C. Charge 14 was added followed by charge 15, which was followed by charge 16. The mixture was stirred for 30 minutes as the temperature was readjusted to 90° C. The resulting mixture was then reverse thinned into charge 17, which was at ambient temperature, and held for 30 minutes. Charge 18 was then added and held for 30 minutes. Charge 19 was then added and held for 30 min. Following the final hold time, the flask set-up was switched to total distillation and the mixture was placed under 21-22 inches of vacuum. Temperature was increased to 55° C. and the mixture was stripped until methyl isobutyl ketone was 0.28%. Final solids were 26.58%. Final molecular weight by GPC (Mz) was 271,266.

Example 9—Preparation of a Comparative Carbamate-Functional Phosphated Epoxy Resin with Neocupurine and a Curing Agent with High Molecular Weight Volatile Groups: A procedure for making a carbamate-functional phosphated epoxy resin with 15% by neocuporine and a curing agent comprising high molecular weight volatile groups (BuCarb-modified curing agent) was performed as follows:

| # | Material | Amount (g) |
|---|---|---|
| 1 | Bisphenol-A Diglycidyl Ether | 92.2 |
| 2 | Bisphenol-A | 29.7 |
| 3 | Butyl carbitol formal | 3.8 |
| 4 | Ethyltriphenylphosphonium Bromide | 0.08 |
| 5 | Methyl isobutyl ketone | 17.7 |
| 6 | Dibutyltindilaurate | 0.18 |
| 7 | Hydroxypropylcarbamate half-capped isophoronediisocyanate from Ex. 5 | 57.2 |
| 8 | Butyl Cellosolve | 19.0 |
| 9 | 2-Ethyl-1-hexanol | 17.7 |
| 10 | 85% Phosphoric Acid | 4.4 |
| 11 | Phenylphosphonic Acid | 4.0 |
| 12 | Ektasolve EEH | 29.3 |
| 13 | Deionized water | 9.5 |
| 14 | Diisopropanolamine | 15.2 |
| 15 | BuCarb modified crosslinker from Ex. 7 | 154.2 |
| 16 | Neocuporine[1] | 60.5 |
| 17 | Deionized water | 229.5 |
| 18 | Deionized water | 500.3 |
| 19 | Deionized water | 60.0 |

[1]Commercially available from Sigma Aldrich.

Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 80° C. When 80° C. was reached, charge 6 was added followed by charge 7 over 1 hour. After 1 hour, residual NCO was checked by IR and none remained. The mixture was then warmed to 90° C. When 90° C. was reached, charges 8-9 were added followed by charges 10-12 (predissolved at ambient temperature). The mixture was allowed to exotherm and the temperature was adjusted to 120° C. The mixture was held at that temperature for 30 minutes, then cooled to 100° C. Charge 13 was added slowly and the mixture was held at 100° C. for 1 hour, then cooled to 90° C. Charge 14 was added followed by charge 15, which was followed by charge 16. The mixture was stirred for 30 minutes as the temperature was readjusted to 90° C. The resulting mixture was then reverse thinned into charge 17, which was at ambient temperature, and held for 30 minutes. Charge 18 was then added and held for 30 minutes. Charge 19 was then added and held for 30 min. Following the final hold time, the flask set-up was switched to total distillation and the mixture was placed under 21-22 inches of vacuum. Temperature was increased to 55° C. and the mixture was stripped until methyl isobutyl ketone was 0.79%. Final solids were 31.23%. Final molecular weight by GPC (Mz) was 313,951.

Formulation and Evaluation of Electrodepositable Coating Compositions: The carbamate-functional epoxy polymers prepared above were then formulated into primer paints at 20% non-volatile compositions with a pigment to binder ratio of 0.20 using the charge amounts from the table below:

| | Ingredient | Comp. Paint A (No Inhibitor) | Comp. Paint B (15% Neocuporine with Bucarb Modified Crosslinker) | Paint C (20% Cure Rite 18-Bucarb Modified Crosslinker) |
|---|---|---|---|---|
| Charge 1 | Example 6 | 1401.36 | — | — |
| (Resin) | Example 9 | — | 1074.50 | — |
| | Example 7 | — | — | 1590.40 |
| Charge 2 | Color Pigment Paste[1] | 239.01 | 182.50 | 229.91 |
| Charge 3 | Deionized Water | 1159.63 | 881.01 | 873.04 |

[1]Commercially available electrocoat paste available through PPG Aerospace.

The paints were prepared by the following procedure: Charge 1 was added to a 1 gallon plastic bucket and agitation was started. Charge 2 was added slowly over 5 minutes. Finally, Charge 3 was added over 5 minutes. The resulting mixture stirred for an additional 15 minutes. The paints were then ultrafiltered to remove 50% of the original mass of the bath which was replaced with additional deionized water to return it to the original starting weight.

Test specimens were prepared by applying coatings onto test coupons consisting of 0.032"×3"×4" 2024 T3 bare aluminum alloy panels. The panels were first cleaned using an acetone wipe. Panels were then immersed in BONDERITE® C-AK 298 ALKALINE CLEANER (previously known as Ridoline® 298 and commercially available from Henkel) for 2 minutes at 130° F. followed by a 1 minute immersion in tap water and a spray rinse of tap water. The panels were then immersed in a deoxidizing bath consisting of BONDERITE® C-IC DEOXDZR 6MU AERO/BONDERITE® C-IC DEOXDZR 16R AERO (previously known as Turco® Deoxidizer 6 Makeup and Turco® Deoxidizer 16 Replenisher, both commercially available from Henkel) for 2'30" at ambient conditions; followed by a 1 minute immersion in tap water and finally a spray rinse of deionized water. The panels were allowed to dry under ambient conditions for 1-2 hours prior to electrocoat application. The paints were electrodeposited onto the test panels using 0.3 amps for 90 seconds at a bath temperature of 75° F. using voltages as listed in the table below to achieve a dry film thickness of 0.89±0.08mils.

| Comp. Paint A (No Inhibitor) | Comp. Paint B (15% Neocuporine Bucarb Modified Crosslinker) | Paint C (20% Cure Rite-18 with Bucarb XL modified Crosslinker) |
|---|---|---|
| 160 | 75 | 80 |

The panels for Comparative Paint A were then cured by baking 30 minutes at 225° F. The panels for Comparative Paint B and Paint C were then cured by baking 60 minutes at 250° F.

The test panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (with the exception that the pH & salt concentration checked weekly as opposed to daily).

The test panels were evaluated after neutral salt fog exposure according to the ratings shown in the table below. The panels were rated according to the following scale for scribe corrosion with a rating scale of 0 to 100 and the number represents the percent of scribe area showing visible corrosion with lower numbers indicating less corrosion and better corrosion inhibition.

| Paint | Description | Hours of Salt Spray Exposure | Scribe Corrosion |
|---|---|---|---|
| Comp. Paint A | No Inhibitor with Unmodified Crosslinker | 1632 | 35<br>35 |
| Paint C | 20% Cure Rite 18 with Bucarb Modified Crosslinker | 1584 | 10<br>15 |
| Comp. Paint B | 15% Neocuporine with Bucarb Modified Crosslinker | 768 | 40<br>35 |

The corrosion data demonstrate that the electrodepositable coating composition Paint A that included morpholin-4-yl morpholine-4-carbodithioate (Cure Rite 18) with BuCarb modified crosslinker measurably enhanced corrosion protection for the metal substrate as compared to an electrodepositable coating composition that did not include the corrosion inhibitor. Evidence of the enhanced corrosion protection is observed in the presence of lower amounts of corrosion in the scribe. In contrast, the neocuporine had no evidence of aiding in corrosion protection compared to the film which contained no corrosion inhibitor.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. An electrodepositable coating composition comprising:

a film-forming binder comprising:

an ionic salt group-containing film-forming polymer; and a curing agent; and a corrosion inhibitor comprising at least one morpholine, wherein the at least one morpholine comprises 4-phenylthiomorpholine-3,5-dione, 2-morpholino-4-phenylthiazole, 4-(4-phenyl-2-thiazolyl)-morpholine, 4-(2-thienylmethyl)morpholine, 4-(4-morpholinylacetyl)morpholine, 4-(4-morpholinyldisulfanyl)morpholine, 2,6-dimethyl-4-[(3-methyl-2-thienyl)carbonyl]morpholine, 2,6-dimethyl-4-(2-pyrazinylcarbonyl)morpholine, 4-[(3-methyl-2-thienyl)methyl]morpholine, 4-{[(4-morpholinylmethyl)sulfanyl]methyl}morpholine, 4-[2-(5-ethyl-2-pyridinyl)ethyl]morpholine, 4-[4-(4-morpholinyl)butyl]morpholine, 4-(5-methoxy-2-methyl-4-pyrimidinyl)morpholine, 4-(5-methyl-2-pyrimidinyl) morpholine, 4-[(1,3-dimethyl-1 h-pyrazol-5-yl) carbonyl]morpholine, 4-[(1-methyl-1 h-pyrazol-5-yl) carbonyl]morpholine, 4-[(3,5-dimethyl-1 hpyrazol-1-yl)carbonyl]morpholine, 4-{[(3-{[2-(4-morpholinyl)-2-oxoethyl]sulfanyl}-1,2,4-thiadiazol-5-yl)sulfanyl] acetyl}morpholine, and/or morpholin-4-yl morpholine-4-carbodithioate.

2. The electrodepositable coating composition of claim 1, wherein the corrosion inhibitor has a passive window value measured as a solution over a substrate greater than the passive window value of a solution without the corrosion inhibitor tested over the same substrate, as measured according to the PASSIVE WINDOW TEST METHOD, and the corrosion inhibitor has a polarization resistance (Rp) measured as a solution over a substrate greater than the polarization resistance (Rp) of a solution without the corrosion inhibitor tested over the same substrate, as measured according to the LINEAR POLARIZATION RESISTANCE TEST METHOD.

3. The electrodepositable coating composition of claim 1, wherein the corrosion inhibitor has a passive window over a 2024-T3 aluminum alloy substrate of greater than 28 mV, as measured according to the PASSIVE WINDOW TEST METHOD.

4. The electrodepositable coating composition of claim 1, wherein the corrosion inhibitor has a polarization resistance (Rp) over a 2024-T3 aluminum alloy substrate of greater than 28±6 $k\Omega*cm^2$, as measured according to the LINEAR POLARIZATION RESISTANCE TEST METHOD.

5. The electrodepositable coating composition of claim 1, wherein the at least one morpholine comprises morpholin-4-yl morpholine-4-carbodithioate.

6. The electrodepositable coating composition of claim 1, wherein the corrosion inhibitor is substantially free of a functional group that reacts with the film-forming binder components.

7. The electrodepositable coating composition of claim 1, wherein the curing agent comprises an at least partially blocked polyisocyanate, an aminoplast resin, a phenoplast resin, or any combination thereof.

8. The electrodepositable coating composition of claim 7, wherein the curing agent comprises high molecular weight volatile groups.

9. The electrodepositable coating composition of claim 1, wherein the ionic salt group-containing film-forming polymer comprises a polymer having hydroxyl functional groups, and the curing agent comprises a crosslinker comprising at least partially blocked isocyanato functional groups.

10. A metal substrate at least partially coated with a coating deposited from the electrodepositable coating composition of claim 1.

11. A multilayer coated metal substrate comprising:

(a) a metal substrate;

(b) a first coating layer present on at least a portion of said metal substrate; and (c) a second coating layer present on at least a portion of the first coating, wherein the first coating layer comprises a coating deposited from the electrodepositable coating composition of claim 1.

12. A method for coating a substrate comprising applying the electrodepositable coating composition of claim 1 to at least a portion of the substrate.

13. The electrodepositable coating composition of claim 1, wherein the corrosion inhibitor comprises the at least one morpholine comprising at least two morpholine groups.

* * * * *